(12) United States Patent
Rajendran et al.

(10) Patent No.: US 10,121,380 B2
(45) Date of Patent: Nov. 6, 2018

(54) AUTOMATIC MOTOR VEHICLE ACCIDENT REPORTING

(71) Applicant: Panasonic Automotive Systems Company of America, division of Panasonic Corporation of North America, Peachtree, GA (US)

(72) Inventors: Shantha Kumari Rajendran, Farmington Hills, MI (US); Padhu Kanagaraj, Farmington Hills, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/679,387

(22) Filed: Aug. 17, 2017

(65) Prior Publication Data

US 2018/0053424 A1 Feb. 22, 2018

Related U.S. Application Data

(60) Provisional application No. 62/376,248, filed on Aug. 17, 2016.

(51) Int. Cl.
*G08G 1/00* (2006.01)
*G07C 5/00* (2006.01)
*B60R 21/00* (2006.01)

(52) U.S. Cl.
CPC ............. *G08G 1/205* (2013.01); *G07C 5/008* (2013.01); *B60R 2021/0027* (2013.01); *B60W 2550/402* (2013.01)

(58) Field of Classification Search
CPC ................... G08G 1/205; G07C 5/008; B60R 2021/0027; B60W 2550/402
See application file for complete search history.

(56) References Cited

U.S. PATENT DOCUMENTS

| | | | |
|---|---|---|---|
| 2013/0086109 A1* | 4/2013 | Huang | G06F 17/30412 707/770 |
| 2014/0375446 A1* | 12/2014 | Wanami | G07C 5/0891 340/436 |
| 2016/0272140 A1* | 9/2016 | Kim | H04M 11/04 |

* cited by examiner

*Primary Examiner* — Leon Flores
(74) *Attorney, Agent, or Firm* — Laurence S. Roach, Esq.

(57) ABSTRACT

An accident reporting arrangement for a motor vehicle includes at least one camera capturing images of an environment surrounding the motor vehicle. A microphone is positioned to produce a microphone signal based on sounds in a passenger compartment of the motor vehicle. A global positioning system determines a global position of the motor vehicle. An electronic processor is communicatively coupled to each of the at least one camera, the microphone, the global positioning system, and a user-actuatable switch. The electronic processor causes an accident reporting signal to be wirelessly transmitted in response to a user actuating the user-actuatable switch. The accident reporting signal is dependent upon the images captured by the at least one camera, the global position of the motor vehicle, and the microphone signal.

16 Claims, 2 Drawing Sheets

AUTOMATIC MOTOR VEHICLE ACCIDENT REPORTING

CROSS-REFERENCED TO RELATED APPLICATIONS

This application claims benefit of U.S. Provisional Application No. 62/376,248 filed on Aug. 17, 2016, which the disclosure of which is hereby incorporated by reference in its entirety for all purposes.

FIELD OF THE INVENTION

The disclosure relates to an accident reporting system for a motor vehicle.

BACKGROUND OF THE INVENTION

Drivers of motor vehicles sometimes see accidents involving other motor vehicles on the road on which they are travelling. Traditionally, the driver needs to make a phone call to 911 to report the accident. Emergency responders ask about the location and other details of the accident. The driver is usually unable to communicate these details due to lack of information as well as panic on the part of the driver.

Currently, it is known for a vehicle to include a system which can automatically report accidents only in which that particular vehicle is involved. Such a system is not capable of capturing and sending photographs of these accidents/incidents.

SUMMARY

The present invention may help travelers in a vehicle in reporting road accidents to an emergency contact. The invention may enable a driver to automatically report road accidents to an emergency contact by pressing an accident report pushbutton connected to a vehicle electronics system. Included in the accident report could be the location, time and photographs of the accident, and possibly a voice mail. The vehicle electronics system can use any network service access to transmit the accident report data to a remote emergency responder. The invention may be used to report accidents seen on the road for other vehicles, pedestrians, animals and life-threatening incidents.

In one embodiment, the invention comprises an accident reporting arrangement for a motor vehicle. The arrangement includes at least one camera capturing images of an environment surrounding the motor vehicle. A microphone is positioned to produce a microphone signal based on sounds in a passenger compartment of the motor vehicle. A global positioning system determines a global position of the motor vehicle. An electronic processor is communicatively coupled to each of the at least one camera, the microphone, the global positioning system, and a user-actuatable switch. The electronic processor causes an accident reporting signal to be wirelessly transmitted in response to a user actuating the user-actuatable switch. The accident reporting signal is dependent upon the images captured by the at least one camera, the global position of the motor vehicle, and the microphone signal.

In another embodiment, the invention comprises a method of operating a motor vehicle, including capturing images of an environment surrounding the motor vehicle. A microphone signal is produced based on sounds in a passenger compartment of the motor vehicle. A global position of the motor vehicle is determined. A user actuating a switch is detected. An accident reporting signal is caused to be wirelessly transmitted in response to the user actuating the switch. The accident reporting signal is dependent upon the images captured of the environment surrounding the motor vehicle, the global position of the motor vehicle, and the microphone signal.

In yet another embodiment, the invention comprises a motor vehicle emergency reporting arrangement for a motor vehicle. The arrangement includes at least one camera capturing images of an environment surrounding the motor vehicle. A microphone is positioned to produce a microphone sisal based on sounds in a passenger compartment of the motor vehicle. A global positioning system determines a global position of the motor vehicle. An electronic processor is communicatively coupled to each of the at least one camera, the microphone, and the global positioning system. The electronic processor causes an emergency reporting signal to be wirelessly transmitted in response to a prompt from the user. The emergency reporting signal is dependent upon the images captured by the at least one camera, the global position of the motor vehicle, and the microphone signal.

An advantage of the present invention is that it enables a vehicular accident to be properly reported with minimal reliance on the actions of a user.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
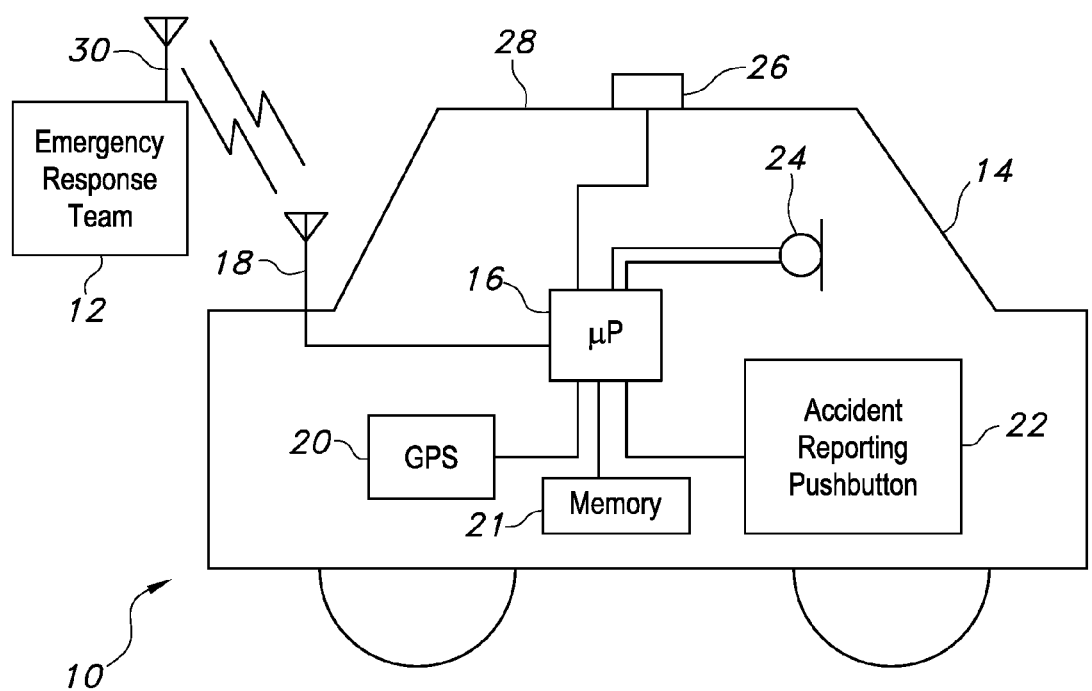
FIG. 1 is a block diagram of one embodiment of an automatic motor vehicle accident reporting arrangement of the present invention.

FIG. 1 illustrates one embodiment of an automatic motor vehicle accident reporting arrangement 10 of the present invention, including an emergency response entity 12 and a motor vehicle 14. Vehicle 14 includes an electronic processor 16 in communication with each of an antenna 18, a global positioning system (GPS) 20, a memory device 21, a user-actuatable switch in the form of an accident reporting pushbutton 22, a microphone 24, and a 360-degree or fisheye camera 26, which may be mounted on a roof 28 of vehicle 14. The 360-degree camera 26 may be replaced by one or more cameras with a narrower field of view. However, use of a 360-degree camera may enable images to be captured of any vehicular accident that occurs within view of vehicle 14, regardless of the direction of the accident with respect to vehicle 14.

During use, camera 26 may continually capture images in every radial direction from its position atop roof 28. Processor 16 may receive the captured images and store them in memory device 21. Memory device 21 may be a first in, first out type of memory device such that the oldest images in device 21 are automatically deleted to make space available for storage of the most recent images. Memory device 21 may store a long enough time span of the most recent images such that an entire automobile accident may be recorded, and the driver has enough reaction time to press accident reporting pushbutton 22. In one embodiment, memory device 21 stores sixty seconds of the most recently captured images, and images older than sixty seconds are deleted.

In response to seeing, hearing, or otherwise becoming aware of a motor vehicle accident that recently occurred within view of vehicle 14, the driver or a passenger within vehicle 14 may press accident reporting pushbutton 22. In response to pushbutton 22 being pushed, processor 16 may wirelessly transmit, via antenna 18, an accident reporting signal including the image data stored in memory device 21, the global position coordinates of vehicle 14 as received from GPS 20, and a microphone signal from microphone 24. The user may provide a voice description of the accident after pressing pushbutton 22, and this voice description may be included in the microphone signal. By pressing pushbutton 22 again when he is through with describing the accident, the user may terminate transmission of the microphone signal.

An antenna 30 at emergency response entity 12 may receive the accident reporting signal wirelessly transmitted from antenna 18. Personnel at emergency response entity 12 may watch the accident images, listen to the audio accident description, and dispatch appropriate emergency responders to the GPS location included in the accident reporting signal.

Figure 2:
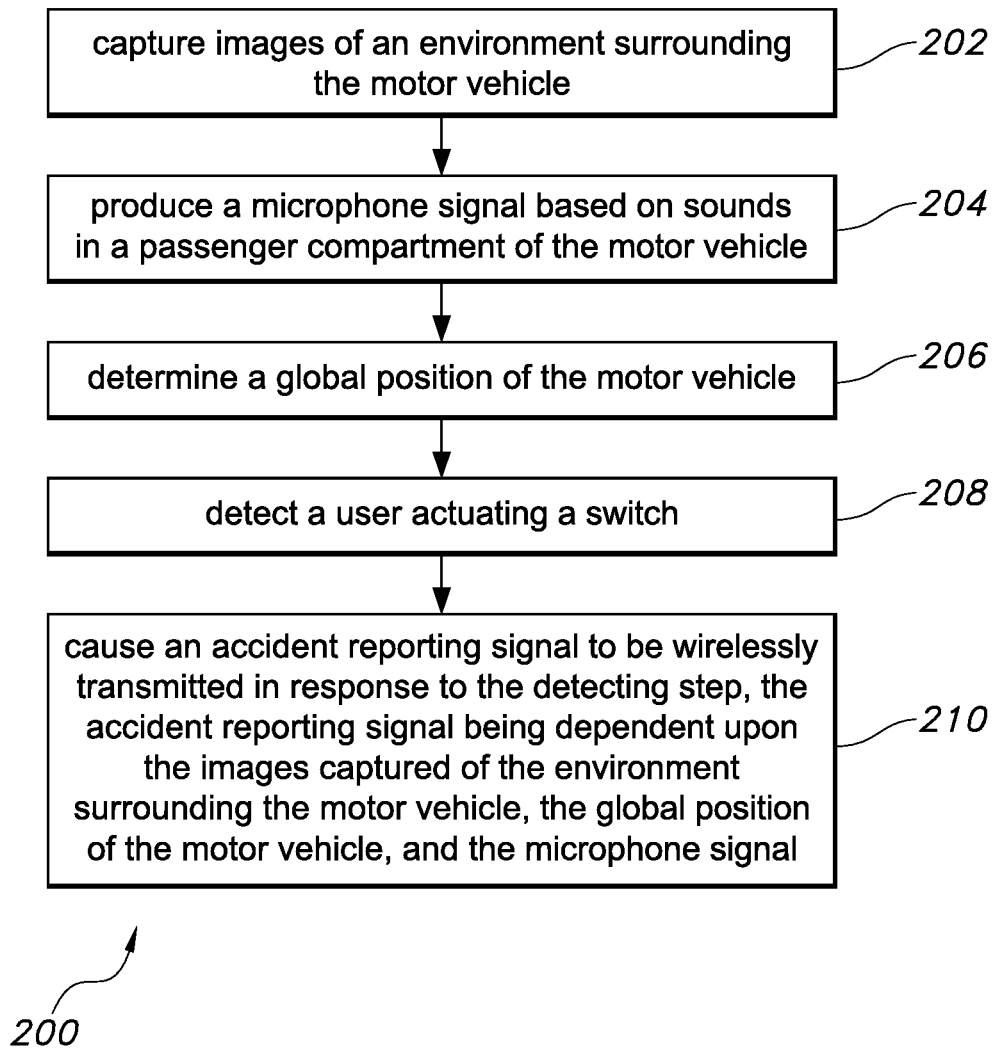
FIG. 2 is a flow chart of one embodiment of a method of the present invention for operating a motor vehicle.

FIG. 2 illustrates one embodiment of a method 200 of the present invention for operating a motor vehicle. In a first step 202, images of an environment surrounding the motor vehicle are captured. For example, camera 26 may continually capture images in every radial direction from its position atop roof 28 of vehicle 14.

In a next step 204, a microphone signal is produced based on sounds in a passenger compartment of the motor vehicle. For example, the user may provide a voice description of an accident after pressing pushbutton 22, and this voice description may be included in a microphone signal produced by a microphone 24.

Next, in step 206, a global position of the motor vehicle is determined. For example, the global position coordinates of vehicle 14 may be determined by GPS 20.

In step 208, a user actuating a switch is detected. For example, it may be detected that a driver of vehicle 14 depresses pushbutton 22.

In a final step 210, an accident reporting signal is caused to be wirelessly transmitted in response to the detecting step. The accident reporting signal is dependent upon the images captured of the environment surrounding the motor vehicle, the global position of the motor vehicle, and the microphone signal. For example, in response to pushbutton 22 being pushed, processor 16 may wirelessly transmit, via antenna 18, an accident reporting signal including the image data stored in memory device 21, the global position coordinates of vehicle 14 as received from GPS 20, and a microphone signal from microphone 24.

The invention has been described herein as being applied to recording and reporting motor vehicle accidents to proper authorities. However, it is to be understood that the invention may also be used to report any event that authorities should be made aware of, such as medical emergencies or crimes, for example.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. An accident reporting arrangement for a motor vehicle, the arrangement comprising:
   at least one camera configured to capture images of an environment surrounding the motor vehicles;
   a microphone positioned to produce a microphone signal based on sounds in a passenger compartment of the motor vehicle;
   a global positioning system configured to determine a global position of the motor vehicle;
   a user-actuatable switch; and
   an electronic processor communicatively coupled to each of the at least one camera, the microphone, the global positioning system, and the user-actuatable switch, the electronic processor being configured to cause an accident reporting signal to be wirelessly transmitted in response to a user actuating the user-actuatable switch, the accident reporting signal being dependent upon:
      the images captured by the at least one camera;
      the global position of the motor vehicle; and
      the microphone signal, wherein the accident reporting signal is dependent upon sounds in the passenger compartment that occur after the user actuates the user-actuatable switch a first time, but is not dependent upon sounds in the passenger compartment that occur before the user actuates the user-actuatable switch the first time, and is not dependent upon sounds in the passenger compartment that occur after the user actuates the user-actuatable switch a second time, the second time being after the first time.

2. The arrangement of claim 1 further comprising a memory device communicatively coupled to the processor and configured to store the images captured by the at least one camera, the accident reporting signal being dependent upon the images stored in the memory device.

3. The arrangement of claim 2 wherein an image stored in the memory device is automatically deleted a particular period of time after the image was captured.

4. The arrangement of claim 1 wherein the at least one camera comprises a 360-degree camera mounted on a roof of the motor vehicle.

5. A method of operating a motor vehicle, the method comprising:
   capturing images of an environment surrounding the motor vehicle;
   producing a microphone signal based on sounds in a passenger compartment of the motor vehicle;
   determining a global position of the motor vehicle;
   detecting a user actuating a switch; and
   causing an accident reporting signal to be wirelessly transmitted in response to the detecting step, the accident reporting signal being dependent upon:
      the images captured of the environment surrounding the motor vehicle;
      the global position of the motor vehicle; and
      the microphone signal, wherein the accident reporting signal is dependent upon sounds in the passenger compartment that occur after the user actuates the switch a first time, but is not dependent upon sounds in the passenger compartment that occur before the user actuates the switch the first time, and is not dependent upon sounds in the passenger compartment that occur after the user actuates the switch a second time, the second time being after the first time.

6. The method of claim 5 further comprising storing the images in a memory device, the accident reporting signal being dependent upon the stored images.

7. The method of claim 6 further comprising automatically deleting an image stored in the memory device a particular period of time after the image was captured.

8. The method of claim 5 wherein the images are captured by a 360-degree camera mounted on a roof of the motor vehicle.

9. A motor vehicle emergency reporting arrangement for a motor vehicle, the arrangement comprising:
  at least one camera configured to capture images of an environment surrounding the motor vehicle;
  a microphone positioned to produce a microphone signal based on sounds in a passenger compartment of the motor vehicle;
  a global positioning system configured to determine a global position of the motor vehicle; and
  an electronic processor communicatively coupled to each of the at least one camera, the microphone, and the global positioning system, the electronic processor being configured to cause an emergency reporting signal to be wirelessly transmitted in response to a prompt from the user, the emergency resorting signal being dependent upon:
    the images captured by the at least one camera;
    the global position of the motor vehicle; and
    the microphone signal, wherein the emergency reporting signal is dependent upon sounds in the passenger compartment that occur after the user provides the prompt, but is not dependent upon sounds in the passenger compartment that occur before the user provides the prompt, and wherein the prompt comprises a first prompt, the emergency reporting signal not being dependent upon sounds in the passenger compartment that occur after the user provides a second prompt, the second prompt being after the first prompt.

10. The arrangement of claim 9 further comprising a memory device configured to store the images captured by the at least one camera, the emergency reporting signal being dependent upon the images stored in the memory device.

11. The arrangement of claim 10 wherein an image stored in the memory device is automatically deleted a particular period of time after the image was captured.

12. The arrangement of claim 9 wherein the first prompt and the second prompt each comprise the user actuating a switch.

13. The arrangement of claim 9 wherein the first prompt and the second prompt each comprise a voice command from the user.

14. The arrangement of claim 9 wherein the at least one camera comprises a 360-degree camera mounted on a roof of the motor vehicle.

15. The arrangement of claim 9 wherein the prompt comprises the user actuating a switch.

16. The arrangement of claim 9 wherein the prompt comprises a voice command from the user.

* * * * *